United States Patent [19]

Downing et al.

[11] Patent Number: 4,684,246
[45] Date of Patent: Aug. 4, 1987

[54] SOFT CONTACT LENS ANALYZER

[76] Inventors: Elizabeth A. Downing; Ronald W. Downing, both of 524 E. Townview Cir., Mansfield, Ohio 44907

[21] Appl. No.: 748,850
[22] Filed: Jun. 26, 1985
[51] Int. Cl.⁴ .............................................. G01B 9/00
[52] U.S. Cl. .................................................. 356/124
[58] Field of Search ..................... 356/124, 125, 127; 73/1 J; 33/200, 507

[56] References Cited

U.S. PATENT DOCUMENTS

| | | | |
|---|---|---|---|
| 3,861,048 | 1/1975 | Thompson | 33/507 |
| 3,985,445 | 10/1976 | Tagnon | 356/125 |
| 4,205,452 | 6/1980 | Wichterle et al. | 33/200 |
| 4,212,107 | 7/1980 | Mezzasalma | 33/174 A |
| 4,277,172 | 7/1981 | Richards | 356/125 |
| 4,283,139 | 8/1981 | Swope | 356/125 |
| 4,323,850 | 4/1982 | Dawson et al. | 33/200 |
| 4,395,120 | 7/1983 | Takahashi | 356/125 |
| 4,496,243 | 1/1985 | Machida | 356/125 |

FOREIGN PATENT DOCUMENTS 2040066 8/1986 United Kingdom ................ 356/124

Primary Examiner—R. A. Rosenberger
Assistant Examiner—Crystal D. Cooper
Attorney, Agent, or Firm—Watts, Hoffmann, Fisher & Heinke Co.

[57] ABSTRACT

A soft contact lens measuring device. A cylindrical lens support defines a cavity and pedestal for immersing a soft contact lens in a saline solution. A piston engages the support and can be operated by the user to force air in controlled amounts through a narrow passageway extending up through the pedestal to the saline solution. A bubble forms and rises until it is trapped by the lens. The interface between the bubble and the lens makes a convenient surface for focusing a radiuscope to allow lens dimensions to be determined.

13 Claims, 5 Drawing Figures

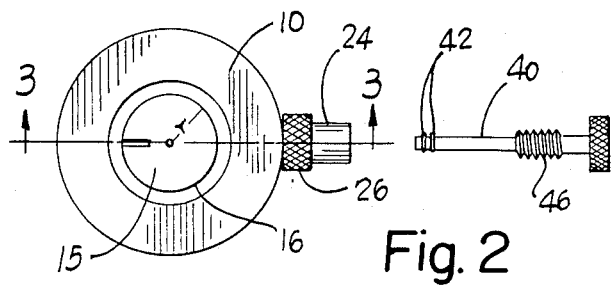
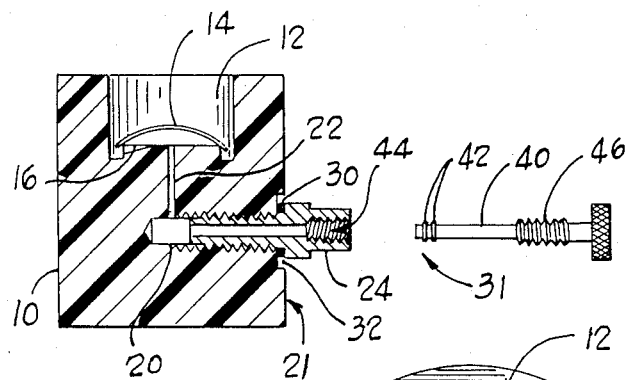
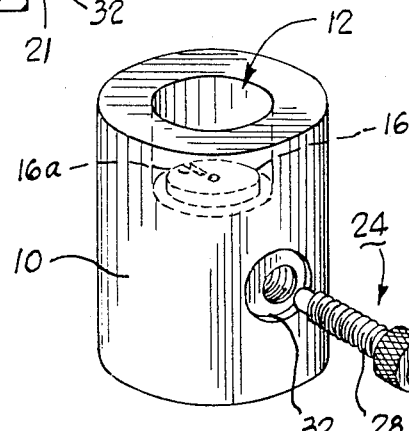
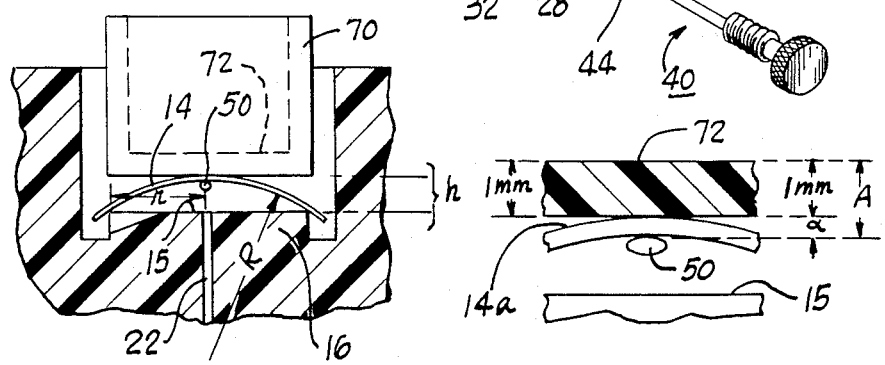

SOFT CONTACT LENS ANALYZER

TECHNICAL FIELD

This invention relates to method and apparatus for measuring physical characteristics of a soft contact lens and, more specifically, for determining a posterior radius of curvature as well as thickness of a soft contact lens.

BACKGROUND ART

For a contact lens to properly fit a wearer, it is important that a posterior radius of curvature of the lens closely match the frontal curvature of the wearer's cornea. One parameter of fit is the base radius of curvature, or base curve. The actual base curve of a soft contact lens should be within 0.1 millimeter of that prescribed for a particular patient. For "extended wear" contact lenses, i.e., those worn for more than twenty-four hours, the fit should be even more accurate.

A soft contact lens is made from a hard plastic material which is capable of absorbing lacrimal fluid. The hard plastic material is lathed and polished into a hard lens with a certain base curve. When this hard lens material is contacted with a saline solution, it absorbs the solution and becomes soft and pliant. The resultant base curve of the hyrated lens may vary markedly from the base curve in the non-hydrated state. Since the soft contact lens assumes its natural shape only when suspended in a solution, it is only then that the base curve can be measured.

Soft lens manufacturers supply nominal base radius values for their lenses. Experience indicates, however, that the nominal values supplied by the manufacturer cannot be used to classify one lens base radius relative another (i.e. larger or smaller) and most certainly are not accurate indications of absolute base radius.

Past methods to measure the base curve have included electrical and ultrasonic methods which require expensive equipment not suited to an opthamologist's or optometrist's office. The lack of precision in the manufacturers specified base radius values casts doubt on the accuracy of these sophisticated measurements.

DISCLOSURE OF INVENTION

The present invention provides an inexpensive, easy to operate and accurate apparatus for measuring soft contact lenses.

One feature of the present invention is that it provides for an apparatus in which a soft contact lens may be suspended in fluid to assume its natural shape so that its radius of curvature and/or thickness can be determined.

Another feature of the present invention is that the apparatus provides a support in the form of a pedestal of known radius upon which a perimeter of the soft contact lens rests while suspended in fluid.

Yet another feature of the present invention is that the apparatus has means to cause an air bubble to be trapped in the fluid at a posterior surface of the lens to form a light reflecting interface. An optical linear distance measurement instrument can then be focused on the interface to measure the radius and/or thickness.

More particularly, the invention provides for an apparatus for measuring the radius of curvature of a soft contact lens comprising a lens support defining an inspection station. A lens is immersed within a liquid to allow the lens to conform to a shape for measurement. A bubble forming means causes a bubble to be trapped beneath the convex surface of the lens to allow optical determination of the position of an interface between the bubble and the lens.

Another feature of the invention is a method and apparatus for measuring the center thickness of a soft contact lens. An insert used in conjunction with the aforementioned apparatus allows a thickness of the lens to be directly measured by focusing on the trapped bubble.

One object of the invention is therefore an improved method and apparatus for measuring the base radius and the center thickness of a soft contact lens. This and other objects, advantages, and features of the invention will become better understood from the accompanying detailed description of a preferred embodiment of the invention when considered in conjunction with the accompanying drawings.

BRIEF DESCRIPTION OF THE DRAWINGS

FIG. 1 is a perspective view of the apparatus of the invention;

FIG. 2 is a top plan view of the Figure apparatus with parts exploded;

FIG. 3 is a cross-sectional view taken on the line 3—3 indicated in FIG. 2;

FIG. 4 is an enlaraged cross-sectional view of a soft contact lens in place in the apparatus; and FIG. 4A is an enlarged cross-sectional view of an insert for measuring the magnifying power of the soft contact lens.

BEST MODE FOR CARRYING OUT THE INVENTION

Referring to FIG. 1, a radius of curvature measuring device 10 is shown as a molded plastic cylinder having a cavity 12 at the top for receiving saline solution. A circular pedestal 16 extends from the bottom of the cavity 12 to support a soft contact lens 14 (FIGS. 3 and 4) in its natural shape. As shown in FIG. 2, the pedestal 16 has a radius r of a predetermined size. A top surface 15 of the pedestal 16 is etched with a target to facilitate focusing on the soft contact lens 14. The target may be a cross, concentric circles, or the like. A notch 16a in the pedestal 16 allows saline solution trapped between the lens 14 and pedestal 16 to escape into the cavity 12. This facilitates placement of the lens on the pedestal.

The measuring apparatus 10 has a threaded bore 20 extending radially inward from an outside surface 21 of the device 10 to a point beneath the pedestal 16. A narrow passageway 22 extends from a center of the pedestal 16 to the threaded bore 20. The passageway 22 is formed by drilling down into the pedestal until the bore 20 is reached. A preferred diameter for the passageway 22 is ten thousandths of an inch.

A threaded piston holder 24 includes a knuckled knob 26, a threaded stem 28 and a sealing ring 30. The stem 28 is screwed into the threaded bore 20 until the sealing ring 30 fits within a circular seat 32 concentric with the bore 20. The knob 26 prevents the piston holder 24 from entering the threaded bore 20 to such an extent that the passageway 32 communicating with the bore 20 is blocked. The sealing ring 30 provides for a liquid-tight seal between the piston holder 28 and the device 10.

A piston 40 threadingly engages the piston holder 24. The piston 40 has two O-rings 42 at one end to seal a central passage 44 in the holder 24. The piston 40 includes a threaded portion 46 that engages a corresponding threaded portion of the passage 44. As the piston 40 is advanced in the piston holder 28, air is forced through the passage 44 to the narrow passageway 22. As shown in FIG. 4, the lens 14, rests on the pedestal 16 and buoyed by solution traps the air forced through the narrow bore 22 so that a bubble 50 forms under a posterior lens surface.

In order to determine the radius of curvature of the soft contact lens 14, the user focuses a radiuscope (not shown) capable of optically measuring linear distances, on the target etched on the pedestal surface 15, and notes the distance. The operator then focuses on an interface between the bubble 50 and the contact lens 14 and again notes the distance. The difference between the two measurements is, as shown in FIG. 4, h. Since the pedestal 16 upon which the lens 14 rests has a known radius $r$, the posterior radius of curvature, or base curve, can be calculated from the well-known formula $$\frac{h^2 + r^2}{2h} = \text{base curve} = R. \qquad (1)$$

With the aid of a special cup shaped clear plastic insert 70 a lens thickness "d" (FIG. 4A) is also measured with the radiuscope. The insert 70 has a 1 mm thick bottom that is inserted into the cavity 12 until the bottom touches a top (convex) lens surface 14a. This contact moves both lens 14 and the bubble 50 so the user again focuses the radiuscope on the bubble/lens interface. The user then adjusts the radiuscope to focus on a surface 72 of the insert 70 which is exposed to air. By subtracting the 1 mm thickness of the insert 70 from the distance "A" (FIG. 4A) determined with the radiuscope the center thickness "d" of the contact lens 14 is known.

The mathematical calculation to determine R in equation (1) is straghtforward and can be performed quite rapidly. Applicants have devised a chart with a plot of "h" versus "R" for a given measuring device 10. The user need only locate the measured distance "h" (FIG. 4) and cross reference a base radius "r" accurate to 0.1 mm.

While one embodiment of the invention has been described in detail various modifications or alterations may be made without departing from the spirit and scope of the invention as set forth in the appended claims.

We claim:

1. Apparatus for measuring a soft contact lens comprising:
    a lens support defining an inspection station, said support having means for supporting a lens immersed within a liquid to allow the lens to conform to a shape for measurement of the lens; and
    bubble forming means for causing a bubble to be trapped beneath a generally concave surface of the lens to allow precise optical determination of the position of an interface between the bubble and the lens.

2. The apparatus of claim 1 where the lens support comprises a cavity defining structure, said structure including a base surface above which extends a pedestal on which the lens rests at the inspection station.

3. The apparatus of claim 2 wherein the lens support defines an air passageway from a top surface of said pedestal to an outside surface of said support, and wherein said bubble forming means comprises a piston moveable with the passageway to force an air bubble from the top of the pedestal into the liquid.

4. The apparatus of claim 3 additionally comprising a piston support that threadingly engages said lens support and wherein the passageway is comprised of a first passageway extending through the center of the piston support and a second passageway extending through the lens support to the top surface of the pedestal.

5. The apparatus of claim 4 wherein the second passageway has a cross-sectional diameter of approximately ten thousandths of an inch.

6. The apparatus of claim 1 additionally comprising a clear plastic insert of a specific thickness which when brought into contact with the lens at the inspection station facilitates measurement of the thickness of the lens.

7. A method for determining a radius of curvature for a soft contact lens comprising the steps of:
    immersing the soft contact lens in a liquid to allow the lens to conform to its natural shape; the shape resulting in a generally convex and a generally concave surface to the lens;
    supporting the soft contact lens on a cylindrical pedestal that engages the concave surface of the lens to determine the length of a chord of a circle that approximates an arc of the lens by equating the length of the chord with a diameter of the cylindrical pedestal;
    determining a perpendicular distance from a midpoint of the chord to the concave surface of the lens; and
    from the perpendicular distance and chord length measurements determining the radius of the circle which approximates the radius of curvature of the soft contact lens.

8. The method of claim 7 wherein the step of determining the perpendicular distance is accomplished by introducing a bubble into the liquid beneath the concave lens surface and optically determining the position of an interface between the bubble and the lens to determine the position of one end of the perpendicular and optically determining the position of a pedestal surface to determine the position of an opposite end of the perpendicular.

9. The method of claim 8 wherein the optical determinations are made by focusing on the interface between the bubble and the lens and the pedestal surface with a radiuscope.

10. Apparatus for measuring the radius of curvature of a soft contact lens comprising:
    a molded plastic lens support that defines a cylindrical cavity at one end for holding a liquid into which a lens is immersed; said support defining a cylindrical pedestal extending away from a base of the cylindrical cavity to support the soft lens in the liquid;
    a piston support threadingly engaging a bore in the lens support; said bore extending from an outside surface of the lens support to a region of the support beneath a center of the cylindrical pedestal; said piston support having a center passageway extending therethrough; and
    a piston that threadingly engages the piston support and can be threaded into the support to direct air into a region of the bore beneath the pedestal; said piston including and O-ring seal around its periphery to seal a region between the piston and the piston support;

said lens support further defining a passageway extending from the bore to a center region of the pedestal so that movement of the piston into the bore causes a bubble to form in the liquid on top of the pedestal and so that continued movement of the piston causes the bubble to break free and be trapped beneath a concave surface of the lens.

11. A method for determining a thickness of a soft contact lens comprising the steps of;

immersing the soft contact lens in a liquid to allow the lens to conform to its natural shape; the shape resulting in a generally convex and a generally concave surface to the lens;

supporting the soft contact lens on a pedestal that engages the concave surface of the lens;

contacting the convex surface of the lens with one surface of an optically clear flat slab of a specific thickness;

introducing a bubble into the liquid beneath the concave surface;

optically determining the position of an interface between the bubble and the lens to determine the position of one end of a perpendicular;

optically determining the position of another surface of the slab not in contact with the lens to determine a perpendicular distance from a concave surface of the lens to said another surface of said slab; and from the perpendicular distance and the specific thickness of the slab determining the thickness of the soft contact lens.

12. The method of claim 11 where the supporting step includes the step of supporting the lens on a cylindrical pedestal.

13. The method of claim 11 wherein the optical determinations are made by focusing on the interface between the bubble and the lens and on the other surface of the slab not in contact with the lens with a radiuscope.

* * * * *